United States Patent
Cotte et al.

(10) Patent No.: US 12,537,183 B2
(45) Date of Patent: Jan. 27, 2026

(54) METHOD FOR RESTORATION PERFORMANCES OF AGED NICKEL-RICH NMC CATHODE MATERIAL FOR LITHIUM-ION SECONDARY BATTERY

(71) Applicants: TOYOTA JIDOSHA KABUSHIKI KAISHA, Toyota (JP); Nederlandse Organisatie voor toegepast-natuurwetenschappelijk onderzoek TNO, The Hague (NL)

(72) Inventors: Stephane Cotte, Brussels (BE); Mahmoud Ameen, The Hague (NL); Bihag Anothumakkool, The Hague (NL)

(73) Assignees: TOYOTA JIDOSHA KABUSHIKI KAISHA, Toyota Aichi-ken (JP); NEDERLANDSE ORGANISATIE VOOR TOEGEPAST-NATUURWETENSCHAPPELIJK ONDERZOEK TNO, The Hague (NL)

( * ) Notice: Subject to any disclaimer, the term of this patent is extended or adjusted under 35 U.S.C. 154(b) by 0 days.

(21) Appl. No.: 18/929,027

(22) Filed: Oct. 28, 2024

(65) Prior Publication Data

US 2025/0140782 A1    May 1, 2025

(30) Foreign Application Priority Data

Oct. 31, 2023   (EP) .................................... 23306886

(51) Int. Cl.
| | | |
|---|---|---|
| H01M 4/04 | (2006.01) |
| H01M 4/1391 | (2010.01) |
| H01M 4/36 | (2006.01) |
| H01M 4/525 | (2010.01) |
| H01M 4/62 | (2006.01) |

(52) U.S. Cl.
CPC ....... H01M 4/0435 (2013.01); H01M 4/0428 (2013.01); H01M 4/0471 (2013.01); H01M 4/1391 (2013.01); H01M 4/366 (2013.01); H01M 4/525 (2013.01); H01M 4/625 (2013.01); H01M 4/628 (2013.01)

(58) Field of Classification Search
None
See application file for complete search history.

(56) References Cited

FOREIGN PATENT DOCUMENTS

WO    WO-2023102107 A1 *  6/2023  ............ H01M 4/136

* cited by examiner

*Primary Examiner* — Michael P. Rodriguez
(74) *Attorney, Agent, or Firm* — Dinsmore & Shohl LLP

(57) ABSTRACT

Method for restoration performances of aged nickel-rich NMC cathode material for lithium-ion secondary battery, the method including: forming a cathode with the aged nickel-rich NMC cathode material and carbon black; and exposing the cathode to diethyl phosphoramidate at an exposure temperature below 160° C. so as to obtain a lithium phosphate protective layer on the cathode.

8 Claims, 3 Drawing Sheets

METHOD FOR RESTORATION PERFORMANCES OF AGED NICKEL-RICH NMC CATHODE MATERIAL FOR LITHIUM-ION SECONDARY BATTERY

CROSS-REFERENCE TO RELATED APPLICATION

This application claims priority to European patent application Ser. No. 23/306,886.5 filed on Oct. 31, 2023. The disclosure of the above-identified application, including the specification, drawings, and claims, is incorporated by reference herein in its entirety.

BACKGROUND

1. Field

The present disclosure relates to method for restoration performances of aged nickel-rich NMC cathode material for lithium-ion secondary battery.

2. Description of Related Art

Lithium-ion secondary batteries make use nickel-manganese-cobalt as material for the cathode. Indeed, such type of material allows for an increase in energy density while allowing for reducing the cost of the cathode. NMC111 is a typical cathode material having the following chemical composition $LiNi_{0.33}Mn_{0.33}Co_{0.33}O_2$.

Nickel-rich NMCs are becoming more and more in focus now in current research due to their higher specific capacity and energy. Nickel-rich NMC is intended for lithium-nickel-manganese-cobalt composition having a molar nickel content at least of 0.5, for example NMC532 having the following chemical composition $LiNi_{0.33}Mn_{0.3}Co_{0.2}O_2$.

However, higher content of nickel increases the reactivity of the material especially when in contact with atmospheric condition. The reaction has an influence on the secondary battery performance. Indeed, aged nickel-rich NMCs show, at the beginning of the charging process, an overpotential peak which is not exhibited with a fresh nickel-rich NMC cathode.

The overpotential peak might have a large influence on the cell production, especially during the activation process.

Indeed, during the formation process (activation of the working material of the battery), i.e., during the first charge/discharge cycle to a full charge of the battery, a solid electrolyte interface (SEI) is formed on the anode by controlling the current and the voltage. High-quality SEI formation is desirable for performance and life of the lithium-ion battery or cell.

The overpotential peak appearing during the first cycle might have a detrimental influence on the quality control of the formation process.

One solution is to store the cathode material under dry conditions. However, this solution increases the cost of the storage facilities and the cathode material should still be used rapidly to reduce the material surface modification.

Currently, it remains desirable to reduce the cost of storage facilities while increasing storage time of the cathode material.

SUMMARY

In this respect, the present disclosure relates to a method for restoration performances of aged nickel-rich NMC cathode material for lithium-ion secondary battery. The method includes:

forming a cathode with the aged nickel-rich NMC cathode material, a binder and carbon black; and exposing the cathode to diethyl phosphoramidate at an exposure temperature above 160° C. (degree Celsius) so as to obtain a lithium phosphate protective layer on the cathode.

By nickel-rich NMC, it is intended lithium-nickel-manganese-cobalt composition having a molar nickel content at least of 0.5.

As non-limiting examples, NMC532 having the following chemical composition $LiNi_{0.5}Mn_{0.3}Co_{0.2}O_2$, NMC622 having the following chemical composition $LiNi_{0.6}Mn_{0.2}Co_{0.2}O_2$ or NMC811 having the following chemical composition $LiNi_{0.8}Mn_{0.1}Co_{0.1}O_2$ may be used.

By aged nickel-rich NMC cathode material, it is intended nickel-rich NMC cathode material exhibiting an overpotential peak during the formation process. Freshly made nickel-rich NMC cathode material and/or nickel-rich NMC cathode material stored in dry condition do not exhibit overpotential peak.

As non-limiting examples, aged nickel-rich NMC cathode material may be nickel-rich NMC cathode material that has been stored at least one month in a normal atmosphere, i.e., not under dry conditions. It is therefore understood that the aged nickel-rich NMC material has reacted and that impurities are present at least on the surface of the aged nickel-rich NMC cathode material.

By providing such a method, it is possible to store nickel-rich NMC material for longer period of time and in storage facilities that do not need to be with humidity control, i.e., in dry condition.

By exposing the cathode to diethyl phosphoramidate, it is possible to avoid short-cut of electronic path that may occur when exposing the cathode material before forming the cathode. It is understood that the diethyl phosphoramidate (DEPA) is reacting with lithium impurities present on the surface of the aged nickel-rich NMC cathode material, such as lithium hydroxide (LiOH), lithium carbonate ($Li_2CO_3$). It is understood that no lithium precursor are added during the formation of the protective layer.

As a non-limiting example, the binder may be polyvinylidene fluoride (PVDF).

According to some embodiments, exposure may be made by a one-precursor atomic layer deposition technique and the exposure temperature is equal to or smaller than 200° C.

Normally, reaction between lithium precursors and diethyl phosphoramidate takes place around 300° C. Thanks to the atomic layer deposition technique, the reaction temperature may be reduced to 200° C. and below. Furthermore, contrary to conventional two-precursor atomic layer deposition, no annealing at 600° C. is requested, which would be detrimental when the coating is made directly on the cathode because it might decompose the binder.

In some embodiments, the atomic layer deposition technique may be an atmospheric spatial atomic deposition technique.

It is understood that the atmospheric spatial atomic deposition technique is a one-precursor atmospheric spatial atomic deposition technique.

In some embodiments, a carrier gas for diethyl phosphoramidate may be argon or nitrogen preheated at the exposure temperature.

As a non-limiting example, argon is a 99.999% pure argon. As a non-limiting example, nitrogen is a 99.99% pure nitrogen.

In some embodiments, a bearing gas may be argon or nitrogen.

As a non-limiting example, argon is a 99.999% pure argon. As a non-limiting example, nitrogen is a 99.99% pure nitrogen.

The bearing gas allows for purging between two supply positions for exposure to diethyl phosphoramidate in the spatial atomic layer deposition equipment.

In some embodiments, an exposure time of the cathode to diethyl phosphoramidate may lie in the range 0.5 second to 6 seconds.

In some embodiments, before exposure to diethyl phosphoramidate, the cathode may be dried at a temperature lying in the range 65° C. to 75° C., for example at 70° C., for at least 24 h (hour).

In some embodiments, forming the cathode may include:
making a slurry preparation with the aged nickel-rich NMC cathode material, a binder and carbon black; and applying the slurry to form a layer, drying the layer and calendering the layer so as to obtain the cathode.

BRIEF DESCRIPTION OF THE DRAWINGS

Features, advantages, and technical and industrial significance of exemplary embodiments will be described below with reference to the accompanying drawings, in which like signs denote like elements, and wherein.

DETAILED DESCRIPTION OF EMBODIMENTS

Figure 1:
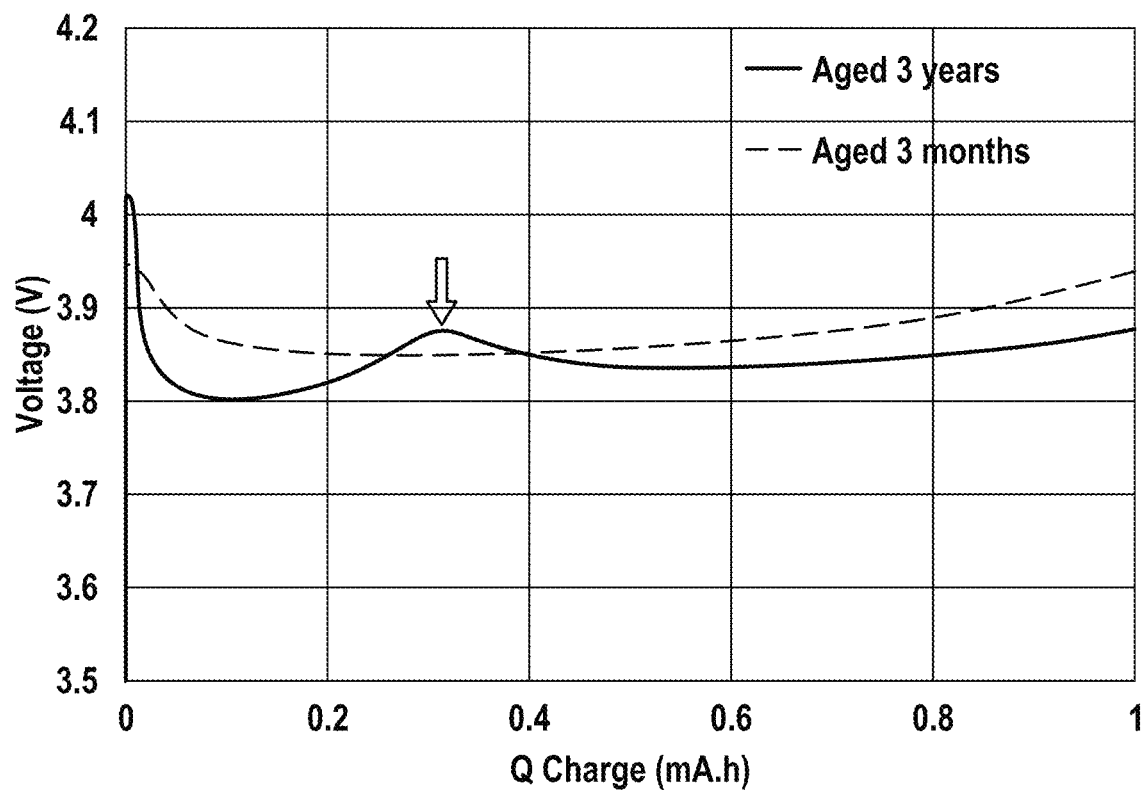
FIG. 1 shows voltage as a function of charge during the first charge for a NMC532 aged three years and three months.

FIG. 1 shows a voltage V (expressed in V (volt)) as a function of the charge Q (expressed in mA.h (milliampere-hour)) for a NMC532 electrode aged three months (dotted line) and three years (plain line) during first charge of the electrode. It can be seen that the curve for the aged three years NMC532 electrode presents an overpotential peak at around 0.3 mA.h. It can also be seen that an initial overpotential is also present, but with a lower voltage value for the aged three months NMC532 electrode compared to the aged three years NMC532 electrode.

Figure 2:
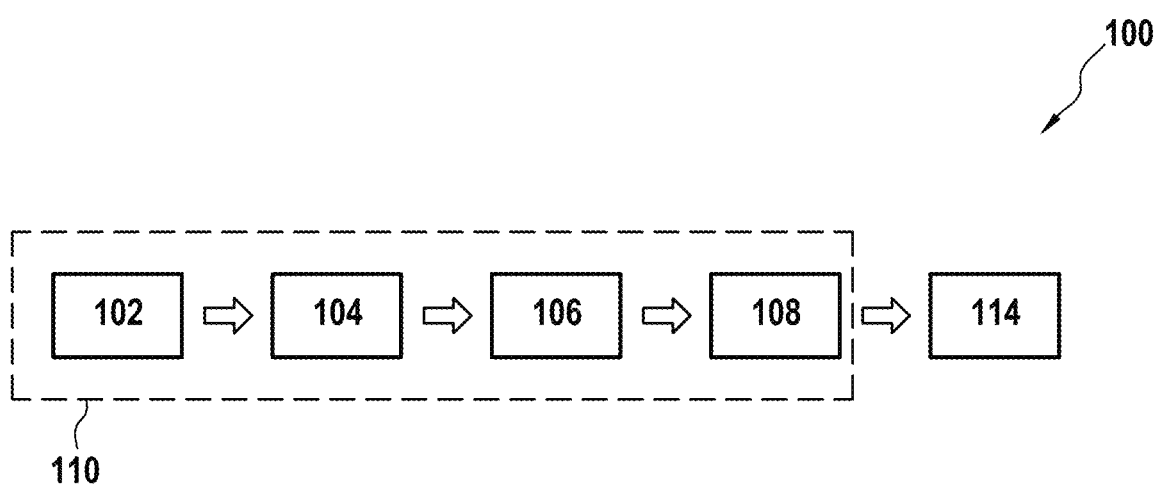
FIG. 2 shows a flow chart of the method according to embodiments of the present disclosure.

FIG. 2 shows a flow chart of the method 100 for restoration performances of aged nickel-rich NMC cathode material for lithium-ion secondary battery. The method includes a step of forming 110 a cathode 10 (see FIG. 3) with the aged nickel-rich NMC cathode material, a binder and carbon black. The step of forming 110 the cathode may include a step of making 102 a slurry preparation with the aged nickel-rich NMC cathode material, a binder and carbon black, a step of applying 104 the slurry to form a layer, drying 106 the layer and calendering 108 the layer so as to obtain the cathode.

The step of forming 110 the cathode is known. Calendering 108 helps in increasing the density of the cathode.

The method includes a step of exposing 114 the cathode 10 to diethyl phosphoramidate at an exposure temperature above 160° C. so as to obtain a lithium phosphate protective layer on the cathode.

Figure 3:
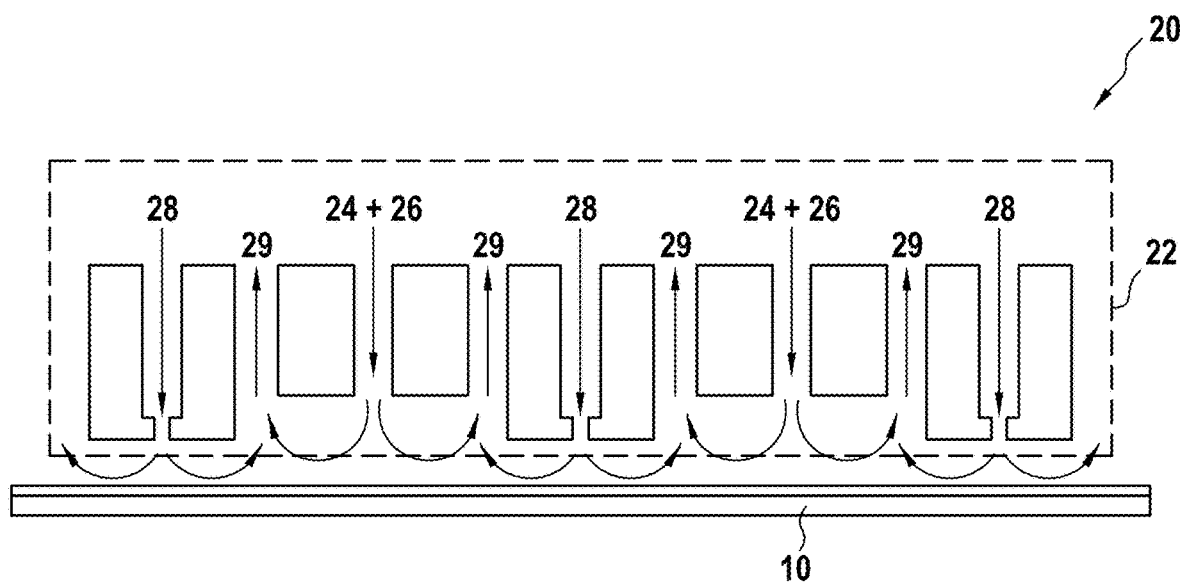
FIG. 3 shows a schematic representation of a spatial atomic deposition head.

As an example, the exposure of the aged nickel-rich NMC cathode may be carried out in an atmospheric spatial atomic layer deposition equipment 20, which is schematically represented in FIG. 3. More specifically, FIG. 3 shows schematically the deposition head 22 of the atmospheric spatial atomic layer deposition equipment 20, where the cathode 10 rotates underneath the deposition head 22. Diethyl phosphoramidate 24 is supplied at the same time at the different positions on the cathode 10 with a carrier gas 26 at atmospheric pressure. Furthermore, a bearing gas 28 is supplied between the different positions where the diethyl phosphoramidate 24 is supplied, so as to purge the system. The exhaust of the gases is referenced as 29.

As non-limiting example, the aged nickel-rich NMC cathode material may be NMC532 cathode material aged three years. The binder may be polyvinylidene fluoride. The cathode 10 obtained based on NMC532 cathode material, polyvinylidene fluoride and carbon black is named hereafter NMC532 cathode.

As a non-limiting example, the gap between the deposition head 22 and the cathode 10 is about 25 μm (micrometre) and both the carrier gas 26 and the bearing gas 28 is 99.999% pure argon.

As a non-limiting example, the NMC532 cathode may be exposed for 666 ms (millisecond) for one cycle and the lithium phosphate ($Li_3PO_4$) protective layer is obtained with ten cycles.

As a non-limiting example, the exposure temperature may be 195° C.

Performances of the NMC532 cathode aged three years with and without the lithium phosphate protective layer are given below, the NMC532 cathode being exposed to ten cycles of 666 ms to diethyl phosphoramidate.

NMC532 cathode aged three years without lithium phosphate protective layer obtained by exposure to diethyl phosphoramidate exhibits an average capacity of 0.85±0.02 mA.h/cm$^2$ at 1 C, a charge transfer resistance Rct of 39±4 Ω/cm$^2$ and total resistance of 49±4 Ω/cm$^2$.

NMC532 cathode aged three years with lithium phosphate protective layer obtained by exposure to diethyl phosphoramidate exhibits an average capacity of 0.88±0.02 mA.h/cm$^2$ at 1 C, a charge transfer resistance Rct of 36.3±0.4 Ω/cm$^2$ and total resistance of 45±1 Ω/cm$^2$.

Figure 4:
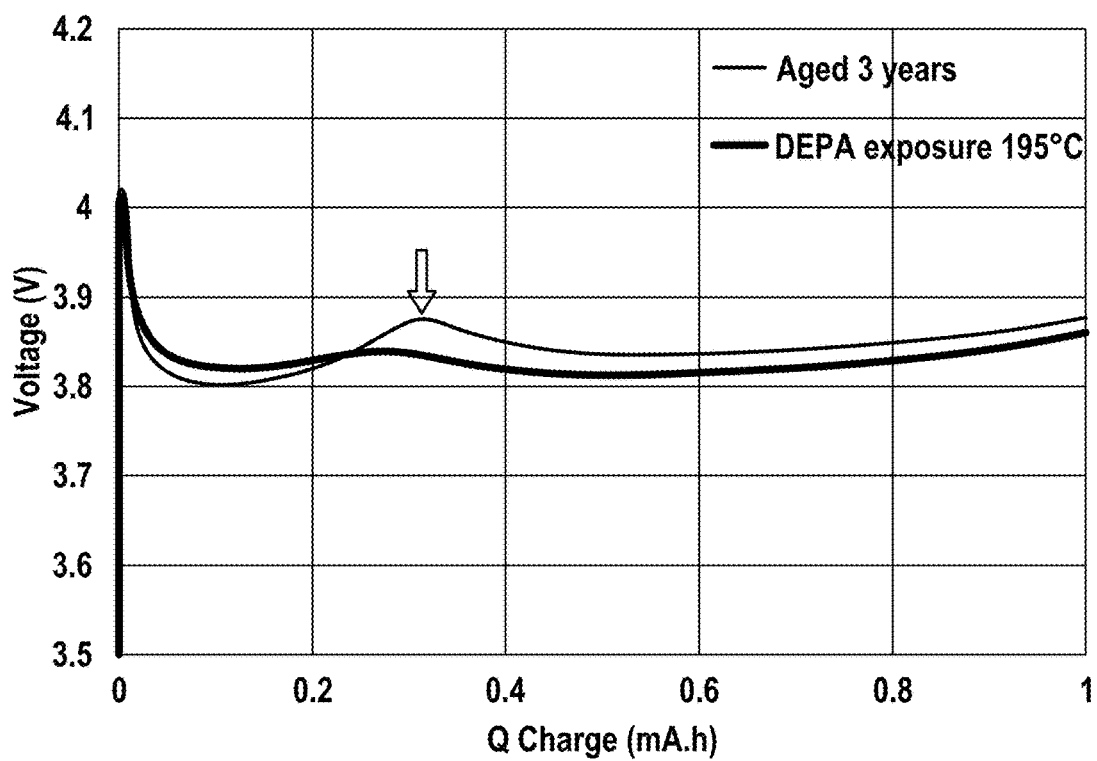
FIG. 4 shows voltage as a function of charge during the first charge for a NMC532 aged three years with and without protective layer.

Thanks to the lithium phosphate protective layer, the average capacity is increased by 3%, the charge transfer resistance is decreased by 7% and the total resistance is decreased by 8%. Furthermore, as shown in FIG. 4, the overpotential peak is significantly decreased. In FIG. 4, the curve corresponding to the NMC532 cathode aged three years without lithium phosphate protective layer is in plain line, and the curve corresponding to the NMC532 cathode aged three years with lithium phosphate protective layer is in bold line.

Charge transfer resistance Rct and total resistance are measured with a cell assembly having the following specifications:
coin cell type (CR2032) battery assembly;
anode: lithium metal 0.45 mm (millimetre) thick and 15 mm in diameter;
cathode: NMC532 aged three years with and without lithium phosphate protective layer, 1.0 mA.h/cm$^2$; 13 mm in diameter (1.33 cm$^2$);
separator: Celgard-2500; 17 mm in diameter;
electrolyte: LP40; 20 μL.

The cycling protocol is as follows: waiting of 6 hours, formation at C/3, capacity check at 1 C, set at SOC (state of charge) 55%, both equipment are at 25° C. and are set to 0° C. for 5 hours and then return to 25° C. after measurement.

Figure 5:
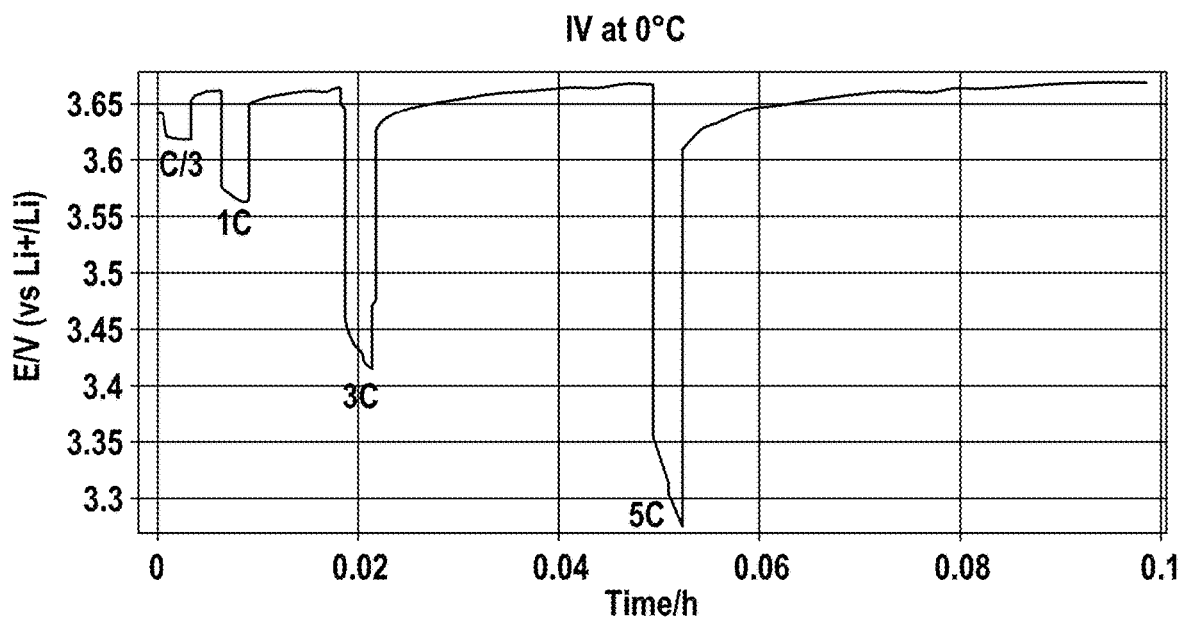
FIG. 5 shows a current-voltage curve measured at 0° C. for the NMC532 aged three years with protective layer.

Total resistance of the cell is measure by IV measurement (current-voltage) as shown in FIG. 5. Different current are applied to the cell and voltage drop is measured. By plotting the current as a function of the voltage drop, the slope gives the total resistance of the cell.

Figure 6:
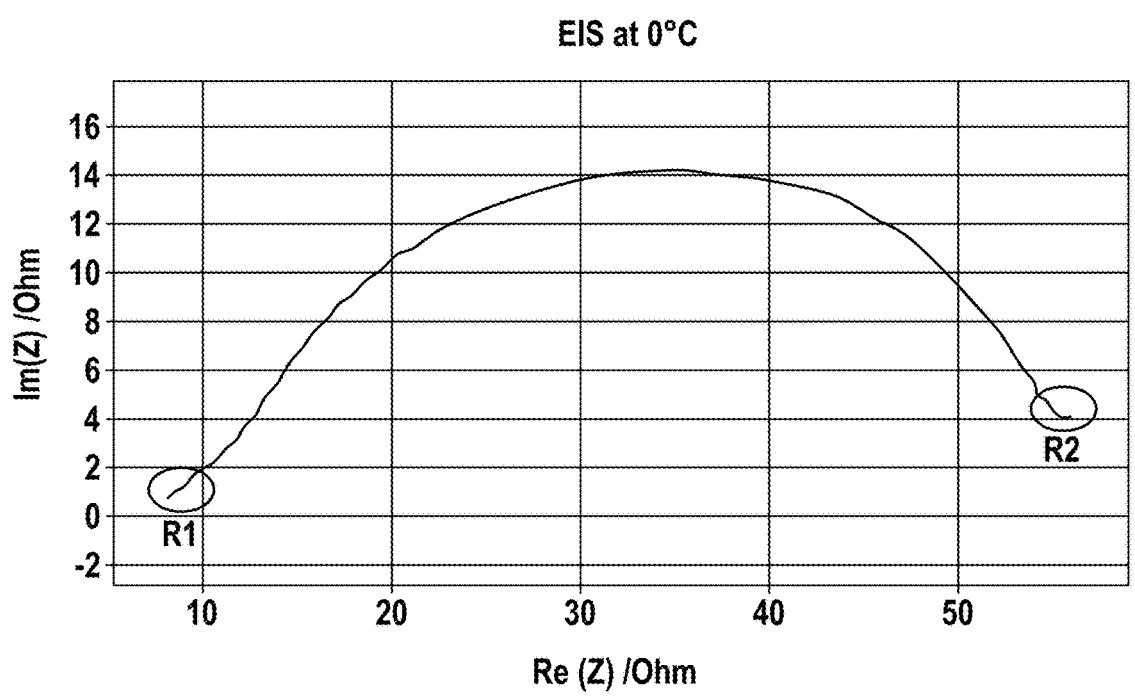
FIG. 6 shows an electrochemical impedance spectroscopy measurement for the NMC532 aged three years with protective layer.

Charge transfer resistance $R_{ct}$ is measure with EIS (Electrochemical Impedance Spectroscopy), as shown in FIG. 6, from 20 kHz-0.1 Hz (hertz) and amplitude 10 mV. $R_{ct}$=(R2−R1)/1.33 in $\Omega/cm^2$.

Although the present disclosure refers to specific exemplary embodiments, modifications may be provided to these examples without departing from the general scope as defined by the claims. In particular, individual characteristics of the different illustrated/mentioned embodiments may be combined in additional embodiments. Therefore, the description and the drawings should be considered in an illustrative rather than in a restrictive sense.

What is claimed is:

1. A method for restoration performances of aged nickel-rich NMC cathode material for lithium-ion secondary battery, the method comprising:
    forming a cathode with the aged nickel-rich NMC cathode material, a binder and carbon black; and
    exposing the cathode to diethyl phosphoramidate at an exposure temperature above 160° C. so as to obtain a lithium phosphate protective layer on the cathode.

2. The method according to claim 1, wherein exposure is made by a one-precursor atomic layer deposition technique and the exposure temperature is equal to or smaller than 200° C.

3. The method according to claim 2, wherein the atomic layer deposition technique is an atmospheric spatial atomic deposition technique.

4. The method according to claim 2, wherein a carrier gas for diethyl phosphoramidate is argon or nitrogen preheated at the exposure temperature.

5. The method according to claim 3, wherein a bearing gas is argon or nitrogen.

6. The method according to claim 1, wherein an exposure time of the cathode to diethyl phosphoramidate lies in a range 0.5 second to 6 seconds.

7. The method according to claim 1, wherein before exposure to diethyl phosphoramidate, the cathode is dried at a temperature lying in a range 65° C. to 75° C. for at least 24 h.

8. The method according to claim 1, wherein forming the cathode comprises:
    making a slurry preparation with the aged nickel-rich NMC cathode material, a binder and carbon black; and
    applying the slurry to form a layer, drying the layer and calendering the layer so as to obtain the cathode.

* * * * *